United States Patent [19]

Falater

[11] Patent Number: 4,618,743

[45] Date of Patent: Oct. 21, 1986

[54] MONOLITHIC TRANSIENT PROTECTOR

[75] Inventor: Scott L. Falater, Melbourne, Fla.

[73] Assignee: Harris Corporation, Melbourne, Fla.

[21] Appl. No.: 675,222

[22] Filed: Nov. 27, 1984

[51] Int. Cl.[4] .............................................. H04B 3/36
[52] U.S. Cl. ............................. 179/16 AA; 179/16 F;
179/170 R; 307/494
[58] Field of Search .......... 179/16 AA, 16 F, 18 FA,
179/27 G, 78 A, 80, 81 R, 170 D, 170 R, 175.3
F, 186; 361/119; 323/260, 270; 333/17, 32;
330/260; 307/355, 296 R, 568, 494, 497

[56] References Cited

U.S. PATENT DOCUMENTS

| | | | |
|---|---|---|---|
| 3,275,911 | 9/1966 | Onodera | 357/41 |
| 3,369,129 | 2/1968 | Wolterman | 307/568 |
| 3,603,811 | 9/1971 | Day et al. | 307/568 |
| 3,605,728 | 9/1971 | Ogle | 128/696 |
| 3,656,025 | 4/1972 | Roveti | 361/58 |
| 3,708,694 | 1/1973 | Evans | 307/560 |
| 3,903,378 | 9/1975 | Lee et al. | 307/571 |
| 3,953,879 | 4/1976 | O'Connor-d'Arlach et al. | 357/22 |
| 4,013,975 | 3/1977 | Kataoka et al. | 330/145 |
| 4,130,735 | 12/1978 | Chambers, Jr. et al. | 179/16 F |
| 4,167,654 | 9/1979 | Bolus et al. | 179/81 R |
| 4,169,215 | 9/1979 | James et al. | 179/16 F |
| 4,176,255 | 11/1979 | Rudisill, Jr. | 179/16 F |
| 4,203,009 | 5/1980 | Tattersall | 179/16 AA |
| 4,306,119 | 12/1981 | Kutzavitch | 179/90 K |
| 4,323,799 | 4/1982 | King et al. | 179/170 R |

Primary Examiner—Gene Z. Rubinson
Assistant Examiner—R. Vaas
Attorney, Agent, or Firm—Barnes & Thornburg

[57] ABSTRACT

The various components of a series current-limiting element are fabricated on a single integrated circuit, resulting in substantial cost savings. MOS technology is employed and the series protection elements include IGFETs. The series current-limiting element impedances are synthesized actively, and the series current-limiting impedance in one of the tip and ring lines accurately tracks the series current-limiting impedance in the other to maintain close longitudinal balance between the tip and ring lines.

12 Claims, 3 Drawing Figures

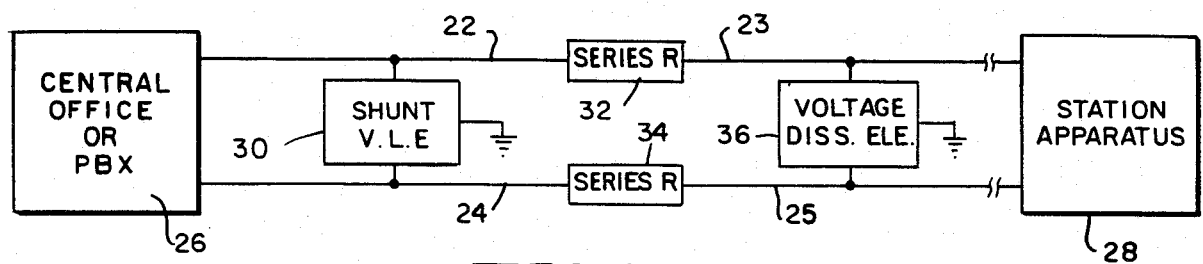
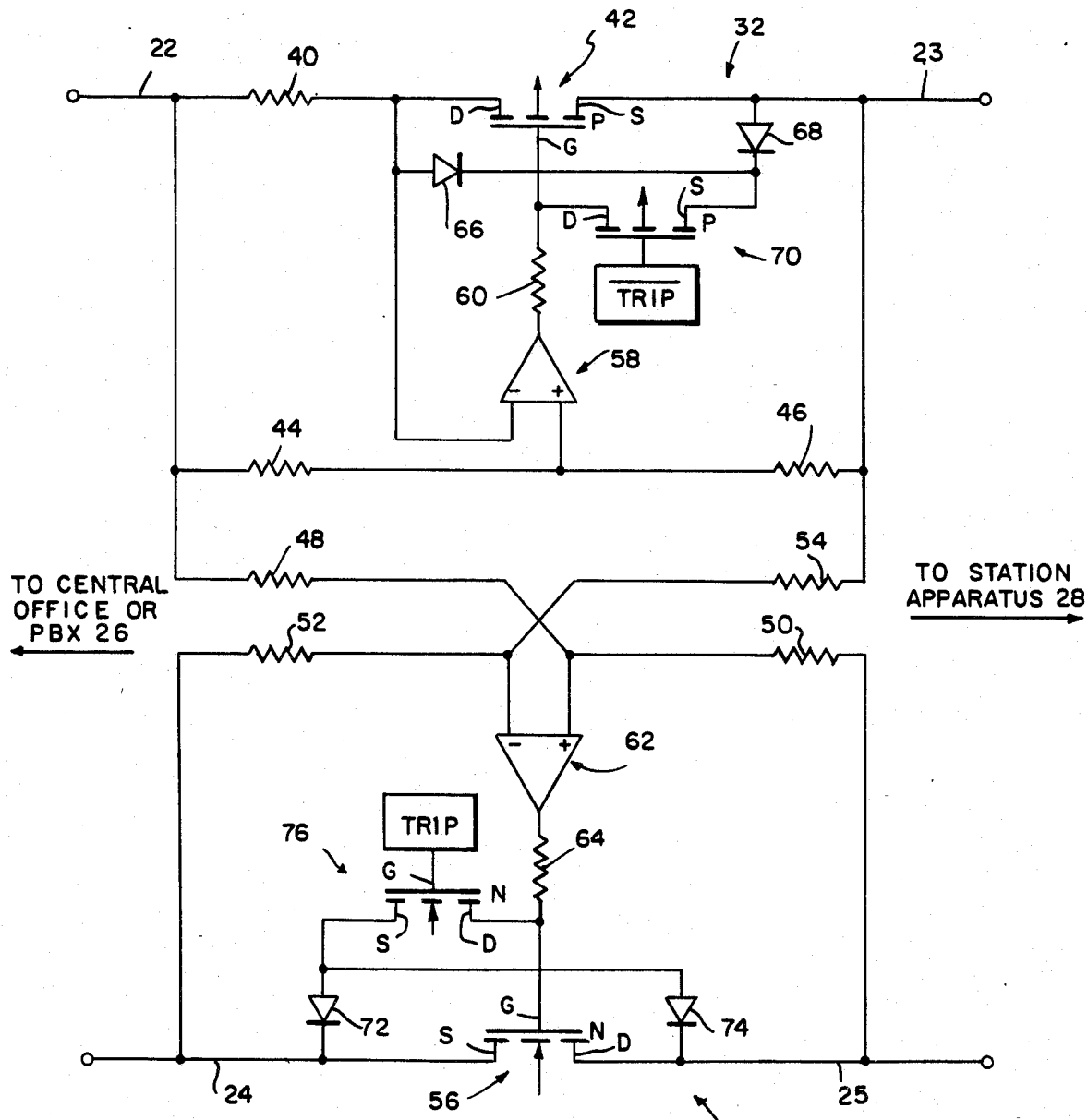

MONOLITHIC TRANSIENT PROTECTOR

This invention relates to transient protectors, and particularly to protection of telephone central offices and private branch exchanges against lightning strikes, power line shorts and similar fault conditions.

Many central office and PBX systems presently employ shunt voltage-limiting elements across the tip/ring pair on the central office side of series current-limiting elements in each of the tip and ring lines, and a carbon block or gas discharge tube shunting the tip and ring lines on the station apparatus side of the series current-limiting elements. In present day systems, the shunt voltage-limiting element ordinarily is a zener diode, SCR or triac. Most of the energy attributable to a fault is dissipated in the carbon block or gas discharge protection device. However, a voltage pulse of, for example, 1500 V magnitude can still exist across the tip/ring pair. The series current-limiting elements presently used to dissipate this energy include resistors, resettable fuses and circuit breakers that trip after predetermined periods of time, assuming the fault persists.

One significant problem that has persisted with such systems has been the matching of the series resistance of the series current limiting elements in the tip and ring lines. This is required to maintain a high "longitudinal" balance. Maintaining this high longitudinal balance is a critical performance parameter for a telephone line interface circuit. The resistances of the series current-limiting elements in the tip and ring lines are frequently required to match each other to within one percent or better in order to achieve suitable performance from the telephone lines. Sometimes this low tolerance matching is difficult to achieve with discrete components without first measuring each component and then using the measured components in matched sets. Occasionally, even matched components drift in value so that a low tolerance match is not maintained. An example of a situation in which a low tolerance match frequently is not maintained is when the series current-limiting elements are resettable fuses, the impedances of which drift each time the fuses trip. The impedances of the fuses in the tip and ring lines can drift in opposite directions or in the same direction by different amounts resulting in an impedance mismatch outside the narrow tolerance limits.

It is known to use active devices as series protection elements in telephone lines. There is, for example, the system of U.S. Pat. No. 4,167,654. U.S. Pat. No. 4,306,119 teaches the use of IGFETs in outpulsing and polarity guard circuits for telephone applications. Active synthesis of the series resistance of a line is illustrated in U.S. Pat. No. 4,013,975. Active synthesis of the series resistances in telephone lines is also illustrated in U.S. Pat. No. 4,203,009, wherein active synthesis of line balancing impedances in two such lines is illustrated.

According to the invention an apparatus is provided for use with a telephone circuit comprising a source of telephone service, a station apparatus and first and second conductors for coupling the source of telephone service and the station apparatus. The apparatus invludes two series current-limiting circuits, each of the two series current-limiting circuits providing a main current conducting path for insertion in series into a respective one of the first and second conductors to provide a variable impedance. Each of the two series current-limiting circuit also includes a control electrode to control the variable impedance, thereby controlling current flow through the respective main current conducting path. One of the series current-limiting circuits includes a network for generating a signal representative of an impedance to be synthesized from the potential across the series current-limiting circuit on its respective conductor. This signal is supplied to the series current-limiting circuit's respective control electrode. The other of the series current-limiting circuits includes a network for monitoring the synthesized impedance, for generating a signal representative of the monitored impedance, and for supplying this signal to its respective control electrode for matching the impedance of the other series current-limiting circuit to the synthesized impedance. The means providing the main current conducting paths of the two series current-limiting circuits comprise first and second field effect transistors, with the main current conducting paths of respective one of the two series current-limiting circuits comprising the source and drain terminals of respective ones of the first and second field effect transistors and the respective control electrodes comprising the gate electrodes of the respective first and second transistors.

Additionally, according to the invention, the synthesizing network comprises a first resistor in series with the main current conducting path of the first transistor and second and third series resistors in parallel with the first resistor and the main current conducting path of the first transistor. The apparatus further includes means for comparing the voltage divided between the first resistor and the main current conducting path of the first transistor to the voltage divided between the second and third resistors and for generating the signal representative of an impedance to be synthesized in response to the comparison.

Further, according to the invention, the network for monitoring the synthesized impedance comprises fourth and fifth series resistors across the lines between the telephone service side of the first transistor and the station apparatus side of the second transistor, and sixth and seventh series resistors across the lines between the telephone service side of the second transistor and the station apparatus side of the first transistor. Means are provided for comparing the voltage divided between the fourth and fifth resistors to the voltage divided between the sixth and seventh resistors and for generating the signal representative of the monitored impedance in response to the comparison.

In the illustrative embodiment of the invention, the apparatus further includes a third field effect transistor, means providing a signal related to a fault condition on the first conductor, and means for coupling the means providing the fault condition-related signal to the gate of the third transistor. Means are provided for supplying voltage from the first conductor to the main current conducting path of the third transistor, and for coupling the main current conducting path of the third transistor to the gate of the first transistor.

Additionally, according to the invention, the apparatus includes a fourth field effect transistor, means providing a signal related to a fault condition on the second conductor, and means for coupling the means providing the last-mentioned signal related to a fault condition to the gate of the fourth transistor. Means are provided for supplying voltage from the second conductor to the main current conducting path of the fourth transistor, and for coupling the main current conducting path of the fourth transistor to the gate of the second transistor.

Further, according to the invention, the first, second, third and fourth transistors, the first and second comparing means, and the first through the seventh resistors are fabricated on a single semiconductor substrate.

The invention may best be understood by referring to the following description and accompanying drawings which illustrate the invention. In the drawings:

FIG. 1 is a block diagram of the telephone circuit between a central office or private branch exchange and a station apparatus;

FIG. 2 illustrates an active network for use as the series current-limiting elements in both of the lines of the circuit of FIG. 1.

Figure 3:
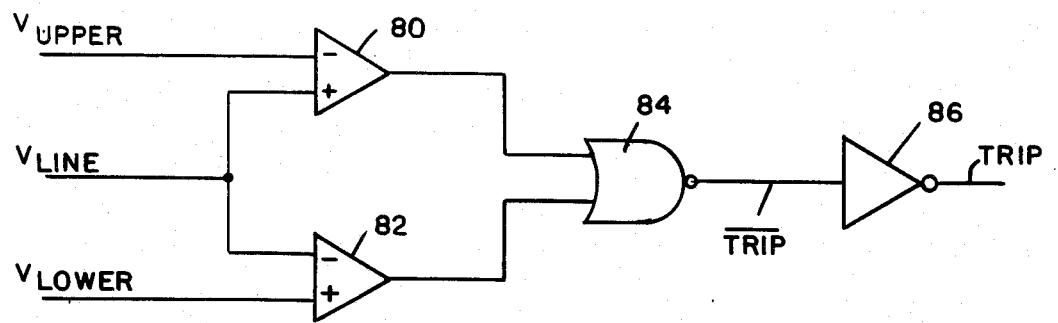
FIG. 3 is a block diagram of a circuit for providing signals useful in the circuit of FIG. 2.

Referring to FIG. 1, tip 22, 23 and ring 24, 25 lines extend from a central office or PBX 26 to a station apparatus 28 such as a telephone. Series current-limiting elements 32, 34 are placed in the tip line 22, 23 and the ring line 24, 25, respectively. A shunt voltage-limiting element 30 is placed across the lines 22, 24 on the central office or PBX 26 side of elements 32, 34. As previously discussed, the shunt voltage limiting element typically is a zener diode, SCR, triac, or the like, which limits the voltage which can appear across the lines 22, 24. Typically, a voltage dissipating element such as a carbon block or gas discharge tube 36 is provided across the tip and ring lines 23, 25 on the station apparatus 28 side of the series current-limiting elements 32, 34.

With particular reference to FIG. 2, the tip line 22, 23 includes a series resistance network 32 including a resistor 40 in series with the drain of a p-channel MOSFET 42. The source of MOSFET 42 is coupled to the carbon block or gas discharge tube (not shown) and station apparatus (not shown). Series resistors 44, 46 are coupled in parallel with resistor 40 and the main current conducting path of MOSFET 42. The tip line 22 is also coupled through series resistors 48, 50 to the ring line 25 on the station apparatus-side of series current-limiting element 34. The ring line 24 on the central office-PBX side of series current-limiting element 34 is coupled through series resistors 52, 54 to the tip line 23 on the station apparatus-side of series current-limiting element 32. Ring line 24 is also coupled to the source of an n-channel MOSFET 56, the drain of which is coupled to the station apparatus (not shown).

The non-inverting (+) input terminal of a differential amplifier 58 is coupled to the common terminal of resistors 44, 46. The inverting (−) input terminal of differential amplifier 58 is coupled to the common terminal of resistor 40 and MOSFET 42. The output terminal of amplifier 58 is coupled through a series resistor 60 to the gate of MOSFET 42.

The non-inverting terminal of an amplifier 62 is coupled to the common terminal of resistors 48, 50. The inverting input terminal of amplifier 62 is coupled to the common terminal of resistors 52, 54. The output terminal of amplifier 62 is coupled through a series resistor 64 to the gate electrode of MOSFET 56. MOSFETs 42, 56 provide the series resistances in the tip line 22, 23 and ring line 24, 25, respectively. The circuit including amplifier 58 and resistors 40, 44, 46 drives MOSFET 42 so that the resistance from the tip line 22 on the central office/PBX side to the tip line 23 on the station apparatus side will be $R_{40}(1+R_{46}/R_{44})$, where $R_{40}$ is the resistance of resistor 40, $R_{44}$ is the resistance of resistor 44 and $R_{46}$ is the resistance of resistor 46. This network actively synthesizes the series resistance in the tip line 22, 23.

On the ring line 24, 25 side of the circuit, amplifier 62 and resistors 48, 50, 52, 54 drive MOSFET 56 so that the resistance from the central office/PBX side ring line 24 to the station apparatus side ring line 25 equals the series resistance between the tip lines 22, 23 between the central office and station apparatus if the resistances of resistors 48, 50, 52, 54 are equal. Thus, in addition to actively synthesizing the resistance in the tip line 22, 23, the resistance in the ring line 24, 25 is actively synthesized and matched to the resistance in the tip line 22, 23.

Additional circuitry is provided to control the series resistances of MOSFETs 42, 56 in the event that fault trip signals are available. This additional circuitry for MOSFET 42 includes a diode 66, the anode of which is coupled to the common terminal of resistor 40 and MOSFET 42, a diode 68, the anode of which is coupled to the common terminal of resistor 46 and MOSFET 42, and a p-channel MOSFET 70, the source of which is coupled to the cathodes of diodes 66, 68 and the drain of which is coupled to the gate of MOSFET 42. A $\overline{\text{TRIP}}$ signal, indicative of absence of a fault condition, is supplied to the gate of MOSFET 70. MOSFET 42 is driven off when the gate of MOSFET 70 is driven negative relative to the voltage on the cathodes of diodes 66, 68. The $\overline{\text{TRIP}}$ signal achieves this function during fault conditions to limit current through the tip line 22, 23.

On the ring line 24, 25 side of the circuit, current is limited during a fault condition by a circuit including a diode 72, the cathode of which is coupled to the common terminal of MOSFET 56 and resistor 52, a diode 74, the cathode of which is coupled to the common terminal of MOSFET 56 and resistor 50, and a MOSFET 76, the source of which is coupled to the anodes of diodes 72, 74 and the drain of which is coupled to the gate of MOSFET 56. A TRIP signal, indicative of the presence of a fault condition, is provided to the gate of MOSFET 76. MOSFET 56 can be turned off by MOSFET 76 if the gate of MOSFET 76 is driven positive relative to the voltage on the anodes of diodes 72, 74.

The operation of the circuit can best be understood by first considering the portion of the circuit including resistors 40, 44, 46, MOSFET 42 and amplifier 58. These components function as an impedance between tip line 23 to station apparatus 28 and tip line 22 to central office 26. It will help to recall that negligible current flows into or from the input terminals of an operational amplifier, such as amplifier 58. Negligible current flows into or from the gate of MOSFET 42. The output voltage, $V_{OUT}$, from amplifier 58 is some gain, $A_O$, times the difference between the voltage (V+) at its non-inverting (+) input terminal and the voltage (V−) at its inverting (−) input terminal.

MOSFET 42 is coupled as a source follower, with its source, S, following its gate, G. One property of a source follower is that its output voltage (here, source voltage) is equal to its input voltage (here, gate voltage) minus some threshold voltage of MOSFET 42. This threshold voltage is nearly constant, so that the AC gain of the source follower MOSFET 42 can be considered to be one.

The resistances of resistors 44 and 46 are chosen to be very large, compared to the impedance being synthesized between drain D and source S of MOSFET 42 and compared to the remaining impedances in the circuit. Since the resistances of resistors 44 and 46 are large, and since negligible current flows into or from the + and − terminals of amplifier 58, the leg of the circuit including resistors 44, 46 can be ignored in the analysis of this circuit. Thus, the current flowing in this circuit is flowing between drain D and source S of MOSFET 42. The equivalent series impedance, $Z_{EQ}$, seen from station apparatus 28 looking toward central office 26 on line 22 is $$Z_{EQ} = \frac{V_{23} - V_{22}}{I_{23}} \quad (1)$$

wherein $V_{23}$ is the voltage between tip line 23 and ground, $V_{22}$ is the voltage between tip line 22 and ground and $I_{23}$ is the current from tip line 23 into MOSFET 42. If $V_T$ is the threshold voltage of MOSFET 42 and $V_{OUT}$ is the output voltage of amplifier 58, $$V- = V_{OUT} - V_T. \quad (2)$$

Since for the amplifier 58

$$V_{OUT} = A_O(V+ - V-), \quad (3)$$

$$V- = \frac{A_O V+ - V_T}{1 + A_O} \quad (4)$$

If it is assumed that $A_O >> 1$ and that, $A_O V+ >> V_T$, then equation (4) simplifies to $$V- = V+. \quad (5)$$

It can readily be seen that $$(V_{23} - V_{22}) \frac{(R_{44})}{(R_{44} + R_{46})} + V_{22} = V+. \quad (6)$$

It will also be appreciated that $$I_{23} = \frac{(V- - V_{22})}{R_{40}}. \quad (7)$$

Combining equations (5) and (6) into equation (7), $$I_{23} = \frac{(V_{23} - V_{22})R_{44}}{R_{40}(R_{44} + R_{46})}. \quad (8)$$

Substituting into equation (1), $$Z_{EQ} = \frac{(V_{23} - V_{22})}{\frac{(V_{23} - V_{22})R_{44}}{R_{40}(R_{44} + R_{46})}} \quad (9)$$

Simplifying, $$Z_{EQ} = R_{40}(1 + R_{46}/R_{44}). \quad (10)$$

Turning now to the manner in which the ring line 24, 25 impedance is matched to the tip line 22, 23 impedance $Z_{EQ}$, consider the circuit including $Z_{EQ}$, resistors 48, 50, 52, 54, MOSFET 56 and amplifier 62. Let it be assumed that $R_{48} = R_{50} = R_{52} = R_{54}$. Also let it be assumed that $R_{48}, R_{50}, R_{52}, R_{54} >> Z_{EQ}$. The bulk of the current which flows in this circuit, then, flows in $Z_{EQ}$ and the source to drain current path of MOSFET 56.

In this circuit, MOSFET 56 is connected as a common source amplifier. For small signal voltages $$V_D = -A_V(V_G - V_S) \quad (11)$$

where $A_V$ is the MOSFET's voltage gain, $V_D$ is its drain voltage, $V_G$ is its gate voltage, and $V_S$ is its source voltage. Again, with reference to operational amplifier 62, we can write $$V_{OUT} = A_O(V+ - V-), \quad (3)$$

where $V_{OUT}$ is the amplifier 62 output voltage, $A_O$ is its gain, $V+$ is the input voltage at its non inverting input terminal, and $V-$ is the input voltage at its inverting input terminal. $V_{25}$, the voltage on ring line 25 with respect to ground, can be written as $$V_{25} = -A_V(V_{OUT} - V_{24}) \quad (12)$$

where $V_{24}$ is the voltage on ring line 24 with respect to ground.

Since $R_{48} = R_{50} = R_{52} = R_{54}$, $$V- = \frac{R_{52} V_{23} + R_{54} V_{24}}{R_{52} + R_{54}} = \frac{V_{23} + V_{24}}{2}, \quad (13)$$

and $$V+ = \frac{R_{50} V_{22} + R_{48} V_{25}}{R_{48} + R_{50}} = \frac{V_{22} + V_{25}}{2}. \quad (14)$$

Substituting equations (3), (13) and (14) into equation (12) yields $$V_{25} = -A_v \left( A_o \frac{(V_{22} + V_{25})}{2} - \frac{V_{23} - V_{24})}{2} - V_{24} \right). \quad (15)$$

Simplifying, $$\frac{\frac{-V_{25}}{A_v} + V_{24}}{A_o} = \frac{V_{22} + V_{25}}{2} - \frac{V_{23} + V_{24}}{2}. \quad (16)$$

However, $$A_O >> V_{24} - V_{25}/A_V$$

Therefore, $$V_{22} - V_{23} = V_{24} - V_{25}. \quad (17)$$

Since the same current is flowing in the tip line 22, 23 and the ring line 24, 25 the impedances in the tip and ring lines are matched.

In FIG. 3, the TRIP and $\overline{\text{TRIP}}$ signals are generated by providing a $V_{LINE}$, the tip line 22 voltage, for example, and two threshold voltages $V_{LOWER}$ and $V_{UPPER}$ from controlled voltage sources, with it being desired to hold $V_{LINE}$ between $V_{LOWER}$ and $V_{UPPER}$. $V_{UPPER}$ is coupled to the inverting (−) input terminal of a comparator 80. $V_{LINE}$ is provided to the non-inverting (+) input terminal of comparator 80. $V_{LOWER}$ is coupled to the non-inverting input terminal of a comparator 82. $V_{LINE}$ is coupled to the inverting input terminal of comparator 82. The output terminals of both of comparators 80, 82 are provided to two input terminals of a NOR gate 84. The output terminal of NOR gate 84 provides the $\overline{\text{TRIP}}$ signal. This signal is inverted through an inverting amplifier 86, the output terminal of which provides the TRIP signal.

The circuit of FIG. 2 achieves series current-limiting with MOSFETs as active elements, actively synthesizes the series resistance of the series current-limiting circuit in each of the tip 22, 23 and ring 24, 25 lines respectively, and actively balances the series resistances of the series current-limiting circuits 32, 34. This results in excellent matching of the tip and ring line series resistances, and avoids drift of these resistances. Again, the tip and ring line series current-limiting circuits 32, 34 can both be implemented on a single integrated circuit chip, resulting in considerable cost savings.

What is claimed is:

1. Apparatus for use with a telephone circuit including a source of telephone service, a station apparatus and first and second conductors for coupling the source of telepnone service and the station apparatus, the apparatus comprising:

first and second current-limiting circuits including first and second variable impedance means respectively each having first and second terminals for insertion in series into a respective one of said first and second conductors for providing a main current conducting path and having a control terminal to control the respective variable impedance means;

first means for supplying a signal representative of an impedance of said first conductor to be synthesized to said control terminal of said first variable impedance means to provide a synthesized impedance of said first conductor; and second means for monitoring an impedance of said second conductor, for comparing said synthesized impedance of said first conductor and monitored impedance of said second conductor and for supplying a matching signal to said control terminal of said second variable impedance means for matching said monitored impedance of said second conductor to said synthesized impedance of said first conductor.

2. The apparatus of claim 1, wherein said first and second variable impedance means includes a first and second transistor respectively.

3. The apparatus of claim 2, wherein said transistors are field effect transistors having a source, drain and gate as said first, second and control terminals respectively.

4. The apparatus of claim 1, wherein said first means includes means for synthesizing said impedance from potential across said first current limiting circuit.

5. The apparatus of claim 2 wherein said first means comprises a first resistor in series with the main current conducting path of the first transistor and second and third series resistors in parallel with the first resistor and the main current conducting path of the first transistor, and means for comparing the voltage at the junction of the first resistor and the main current conducting path of the first transistor to the voltage at the junction of the second and third resistors and for generating the signal representative of said synthesized impedance.

6. The apparatus of claim 5 wherein said second means comprises fourth and fifth series resistors between said first terminal of the first transistor and said second terminal of the second transistor, sixth and seventh series resistors between said first terminal of the second transistor and said second terminal of the first transistor, and for comparing the voltage at the junction of the fourth and fifth resistors to the voltage at the junction of the sixth and seventh resistors and for generating said matching signal.

7. The apparatus of claim 6 and further comprising a third field effect transistor, first fault means for providing a first fault signal related to a fault condition on the first conductor, means for coupling the first fault means to the gate of the third transistor, means for supplying volage from the first conductor to the main current conducting path of the third transistor, and means for coupling the main current conducting path of the third transistor to the gate of the first transistor.

8. The apparatus of claim 7 and further comprising a fourth field effect transisistor, secend fault means for providing a second fault signal related to a fault condition on the second conductor, means for coupling the second fault means to the gate of the fourth transistor, means for supplying voltage from the second conductor to the main current conducting path of the fourth transistor, and means for coupling the main current conducting path of the fourth transistor to the gate of the second transistor.

9. The apparatus of claim 8 wherein the first, second, third and fourth transistors, the first and second comparing means, and the first through the seventh resistors are fabricated on a single semiconductor substrate.

10. The apparatus of claim 2 and further comprising a third field effect transistor, first means for providing a first fault signal reiated to a fault condition on the first conductor, means for coupling the first fault means to and gate of the third transistor, means for supplying voltage from the first conductor to the main current conducting path of the third transistor, and means for coupling the main current conducting path of the third transistor to the gate of the first transistor.

11. The apparatus of claim 10 and further comprising a fourth field effect transistor, second fault means for providing a second fault signal related to a fault condition on the second conductor, means for coupling the second fault means to the gate of the fourth transistor, means for supplying voltage from the second conductor to the main current conducting path of the fourth transistor, and means for coupling the main current conducting path of the fourth transistor to the gate of the second transistor.

12. The apparatus of claim 11 wherein the first, second, third and fourth transistors are fabricated on a single semiconductor substrate.

* * * * *